United States Patent Office 3,180,092
Patented Apr. 27, 1965

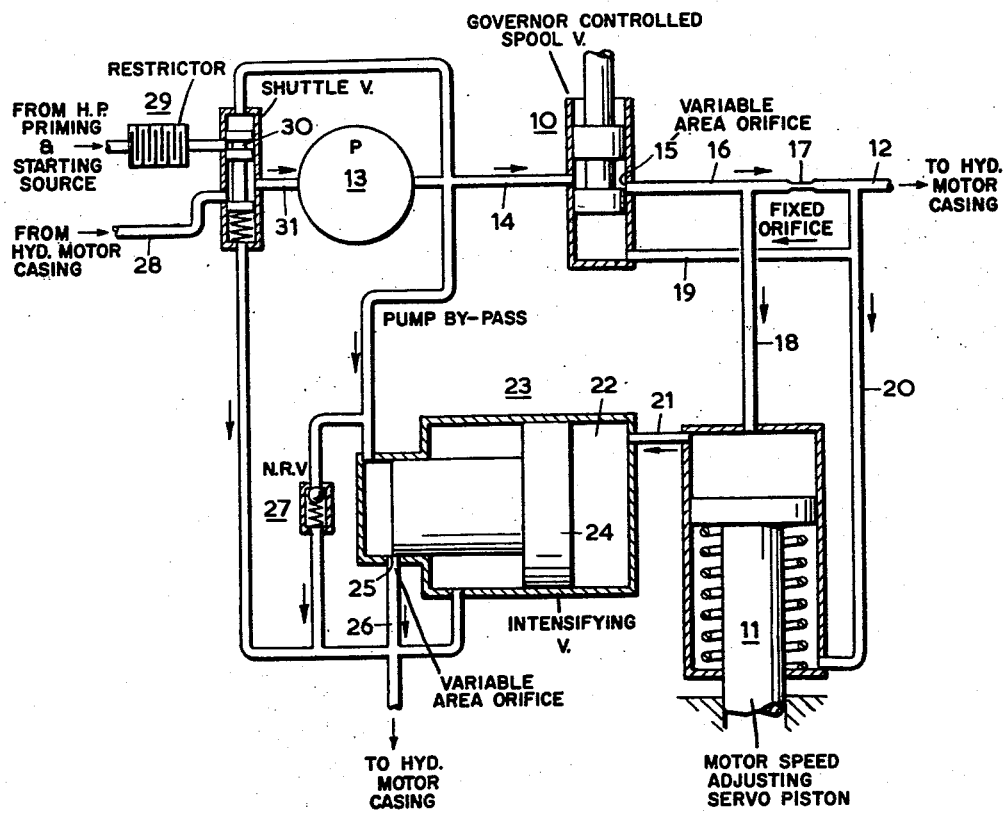

3,180,092
CONTROL SYSTEM FOR AN HYDRAULIC MOTOR
Joseph Park Mooney, Rockford, Ill., assignor to The English Electric Company Limited, London, England, a British company
Filed Apr. 16, 1963, Ser. No. 273,513
Claims priority, application Great Britain, Apr. 19, 1962, 15,284/62
4 Claims. (Cl. 60—52)

This invention relates to a control system for an hydraulic motor.

According to one aspect of the invention a control system for an hydraulic motor having speed adjusting means, comprises a pump for delivering fluid under pressure, fluid pressure varying means responsive to the motor speed for varying the pressure of fluid supplied from the pump outlet in accordance with the motor speed, and fluid pressure responsive means responsive to fluid from the fluid pressure varying means for controlling the operation of the motor speed adjusting means in a sense tending to maintain the motor speed at a predetermined adjustable speed and for controlling the fluid pressure at the pump outlet in such manner as to cause the motor to operate at the predetermined speed independent of load.

According to one feature of the invention the fluid pressure responsive means comprises a first fluid pressure responsive device for controlling the operation of the motor speed adjusting means, and a second fluid pressure responsive device responsive to the fluid pressure at the first fluid pressure responsive device for controlling the fluid pressure at the pump outlet.

According to another feature of the invention the fluid pressure responsive means is arranged to throttle a second outlet from the pump for controlling the fluid pressure at the pump outlet.

According to a further feature of the invention the fluid pressure responsive means controls the pressure at the pump outlet by controlling a by pass connected with the pump outlet.

Preferably the first fluid pressure responsive device comprises a servo piston and the second fluid pressure responsive device comprises a proportioning valve.

The hydraulic motor may be of the positive displacement type in which the speed adjusting means comprises cam means, or alternatively the motor may be of the positive displacement type in which the speed adjusting means comprises swash plate means.

One control system in accordance with the invention for controlling a swash plate type hydraulic motor will now be described, by way of example, with reference to the accompanying diagrammatic drawing.

In the drawing the reference 10 denotes a governor controlled spool valve the position of which is controlled by a governor (not shown) in accordance with the speed of the hydraulic motor (not shown). The reference 11 denotes a spring loaded servo piston which is movable to vary the angle of the swash plate of the motor for adjusting the motor speed, and the system output line which delivers fluid to the hydraulic motor casing is indicated by the reference 12.

Fluid for operating the servo piston is delivered from a source (not shown) by a pump 13 driven by the motor and passes through a line 14, through the spool valve 10, a variable area orifice 15 which is controlled by the spool valve to a line 16, and thence through a fixed orifice 17 to the line 12.

Between the orifice 15 and the orifice 17 fluid is fed via a line 18 to one side of the spring loaded servo piston 11 and on the output side of the fixed orifice 17 fluid is fed through lines 19 and 20 respectively to the back of the spool valve and the other side of the servo piston.

The fluid from the motor casing is fed to the pump through a line 28 and a non-return valve 27 is provided in the pump outlet circuit and determines the maximum pressure at the pump outlet.

The system is initially primed and started from a source of high pressure fluid (not shown) through a restrictor 29 from which the fluid passes through a shuttle valve 30 to the pump inlet 31 and when the motor has reached a predetermined speed the spool valve changes over to connect the system to the fluid from the motor casing.

The arrangement so far described operates such that under steady state conditions the effective area of the orifice 15 is the same as the effective area of the fixed orifice 17. However, if the motor load increases so that the motor speed falls the governor controlled spool valve 10 operates as a pressure varying means which by increasing the effective area of the orifice 15 relative to that of the orifice 17 causes a consequent increase in the pressure in the lines 16 and 18 so that the fluid pressure of the fluid supplied to the servo piston is increased whereby the servo piston moves to change the angle of the swash plate to increase the motor speed. For a decrease in motor load the system operates in the reverse sense.

Although this arrangement provides a stable system it does not compensate fully for the change in the motor speed so that the system has a drooping speed characteristic with increasing load.

In order to compensate for the drooping speed-load characteristic fluid is fed from the cylinder of the servo piston 11 through a line 21 to the large area side of a 2 to 1 intensifying valve 23 having a piston 24.

Movement of the piston 24 of the intensifying valve controls the area of a variable area orifice 25 which is in a by-pass line 26 connected with the outlet of the pump and the output from which is fed back to the motor casing.

Thus, if the speed of the motor falls the resultant increase in the fluid pressure of the fluid in the cylinder of the servo piston 11 is also effective on the large area side of the valve 23 which thus moves to reduce the area of the orifice 25.

Restriction of the orifice 25 restricts fluid flow in the by-pass line 26 so that the pressure at the outlet of the pump increases with a consequent increase in the pressure of the fluid to the servo piston 11 which will thus move to adjust the motor swash plate.

With a suitable choice of system constants the servo piston and the intensifying valve operate as pressure responsive means which cause the motor to operate at a predetermined adjustable speed independent of load and the response of the system to a step function distribution is an exponentially damped oscillation of the servo piston about its new position, and the speed of the motor also exhibits the same characteristic of a decaying oscillation falling about the nominal speed setting.

When this transient oscillation is complete the intensifying valve maintains a fixed ratio of pressure across the spool valve 10 thus restoring it to its nominal position.

Whilst the invention has been described in relation to its use with a swash plate type hydraulic motor it can be applied to other types of positive displacement hydraulic pumps, for example, of the kind in which cam means are used for adjusting the motor speed and are controlled by the servo piston.

What I claim as my invention and desire to secure by Letters Patent, is:

1. In or for an hydraulic motor having speed adjusting means a control system comprising a pump for delivering fluid under pressure at the pump outlet; fluid pressure varying means supplied with fluid from the pump outlet and responsive to the motor speed for producing at an outlet fluid at a pressure which is dependent upon the motor speed, a first fluid pressure responsive device responsive to fluid from the outlet of the fluid pressure varying means for controlling the operation of the motor speed adjusting means, and a second fluid pressure responsive device responsive to the fluid pressure in the first fluid pressure responsive device for controlling the fluid pressure at the pump outlet.

2. A motor control system according to claim 1 in which the second fluid pressure responsive device controls the fluid pressure at the pump outlet by controlling a second outlet from the pump.

3. A motor control system according to claim 1, in which the second fluid pressure responsive device controls the fluid pressure at the pump outlet by controlling a by-pass connected with the pump outlet.

4. In or for an hydraulic motor having speed adjusting means a control system comprising a pump for delivering fluid under pressure at the pump outlet, fluid pressure varying means supplied with fluid from the pump outlet and responsive to the motor speed for producing at an outlet fluid at a pressure which is dependent upon the motor speed, a servo piston responsive to fluid from the outlet of the fluid pressure varying means for controlling the operation of the motor speed adjusting means, and an intensifying valve responsive to fluid pressure in the servo piston for controlling the fluid pressure at the pump outlet.

References Cited by the Examiner
UNITED STATES PATENTS 3,054,263  9/62  Budzich et al. _____ 60—52
3,093,946  6/63  Pitt et al. _____ 60—19 X JULIUS E. WEST, *Primary Examiner.*

EDGAR W. GEOGHEGAN, *Examiner.*